US009503921B2

(12) United States Patent
Luo et al.

(10) Patent No.: US 9,503,921 B2
(45) Date of Patent: Nov. 22, 2016

(54) METHOD FOR DETERMINING SCRAMBLING CODE CONFLICT AND APPARATUS FOR DETERMINING SCRAMBLING CODE CONFLICT

(71) Applicant: Huawei Technologies Co., Ltd., Shenzhen, Guangdong (CN)

(72) Inventors: Xi Luo, Chengdu (CN); Yan Qi, Shanghai (CN); Huan Zhang, Shenzhen (CN); Ping Song, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/743,397

(22) Filed: Jun. 18, 2015

(65) Prior Publication Data
US 2015/0289151 A1   Oct. 8, 2015

Related U.S. Application Data

(63) Continuation of application No. PCT/CN2012/087693, filed on Dec. 27, 2012.

(51) Int. Cl.
*H04W 36/36* (2009.01)
*H04W 24/04* (2009.01)
*H04W 72/04* (2009.01)
(Continued)

(52) U.S. Cl.
CPC ......... *H04W 24/04* (2013.01); *H04W 36/0094* (2013.01); *H04W 72/0466* (2013.01); *H04W 36/0072* (2013.01); *H04W 76/021* (2013.01); *H04W 88/08* (2013.01)

(58) Field of Classification Search
CPC ..................................................... H04W 36/36
USPC ............................................. 455/437; 370/331
See application file for complete search history.

(56) References Cited

U.S. PATENT DOCUMENTS

| 8,463,273 B2 * | 6/2013 | Magadi Rangaiah | H04W 48/20 370/331 |
| 2008/0039141 A1 * | 2/2008 | Claussen | H04W 72/02 455/561 |

(Continued)

FOREIGN PATENT DOCUMENTS

| CN | 101662809 A | 3/2010 |
| CN | 101815314 A | 8/2010 |

(Continued)

OTHER PUBLICATIONS

Yuan Liu, "Problems and case analysis of WCDMA soft handover", Jun. 15, 2012, 4 pages.

*Primary Examiner* — Christopher M Brandt

(57) ABSTRACT

Embodiments of the present invention relate to a method for determining a scrambling code conflict and an apparatus for determining a scrambling code conflict. The method includes: determining a serving cell before a handover of a user equipment fails, and determining a current serving cell of the user equipment; and comparing frequencies and scrambling codes of the current serving cell and a neighboring cell of the serving cell before the handover fails, and determining, according to a result of the comparing, that a scrambling code conflict exists between the current serving cell and the neighboring cell of the serving cell before the handover fails. A probability of a handover failure of a user equipment is reduced, so as to ensure that a service of the user equipment runs normally.

20 Claims, 4 Drawing Sheets

(51) Int. Cl.
*H04W 36/00* (2009.01)
*H04W 88/08* (2009.01)
*H04W 76/02* (2009.01)

(56) References Cited

U.S. PATENT DOCUMENTS

| | | |
|---|---|---|
| 2010/0173626 A1 | 7/2010 | Catovic |
| 2010/0297955 A1 | 11/2010 | Marinier et al. |
| 2011/0159901 A1 | 6/2011 | Frenger et al. |
| 2012/0069732 A1 | 3/2012 | Xu et al. |
| 2012/0099442 A1 | 4/2012 | Bakker et al. |
| 2014/0004851 A1* | 1/2014 | Fix ................... H04B 1/707 455/425 |
| 2014/0004860 A1 | 1/2014 | Maida et al. |
| 2014/0194123 A1 | 7/2014 | Wang et al. |
| 2015/0119041 A1 | 4/2015 | Wang |
| 2015/0156707 A1* | 6/2015 | Gunnarsson ......... H04B 1/7083 455/434 |
| 2015/0257064 A1* | 9/2015 | Lundqvist ......... H04W 36/0083 370/331 |

FOREIGN PATENT DOCUMENTS

| | | |
|---|---|---|
| CN | 102413494 A | 4/2012 |
| CN | 102484802 A | 5/2012 |
| CN | 102802186 A | 11/2012 |
| CN | 102821384 A | 12/2012 |
| EP | 2 009 932 A1 | 12/2008 |
| GB | 2482071 A | 1/2012 |

\* cited by examiner

METHOD FOR DETERMINING SCRAMBLING CODE CONFLICT AND APPARATUS FOR DETERMINING SCRAMBLING CODE CONFLICT

CROSS-REFERENCE TO RELATED APPLICATIONS

This application is a continuation of International Application No. PCT/CN2012/087693 filed on Dec. 27, 2012, which is hereby incorporated by reference in its entirety.

TECHNICAL FIELD

Embodiments of the present invention relate to the field of communications technologies, and in particular, to a method for determining a scrambling code conflict and an apparatus for determining a scrambling code conflict.

BACKGROUND

In a Wideband Code Division Multiple Access (WCDMA) system, a function of a downlink scrambling code in a downlink is to distinguish different cells. Only one primary scrambling code is allocated to each cell to distinguish a cell from another cell. However, in a WCDMA network, the number of cells is generally much greater than the number of scrambling code sets, and therefore, a problem of scrambling code reuse exists, which may cause a failure of a cell handover of a user equipment, and eventually cause call drop or cell update of the user equipment. In addition, a problem of a missing configuration of a neighboring cell of a primary serving cell of the user equipment may also cause a failure of a cell handover of the user equipment, and eventually cause call drop or cell update of the user equipment.

In the prior art, each base station measures a scrambling code of a neighboring cell of the base station, and compares the scrambling code with its own scrambling code to determine whether a scrambling code conflict exists, so as to modify the scrambling code to reduce a probability of call drop or cell update of a user equipment. However, this method is difficult to implement detection of a scrambling code conflict in a scenario, such as a common WCDMA macro station or micro station, thereby causing call drop or cell update because of a failure of a cell handover.

SUMMARY

Embodiments of the present invention provide a method for determining a scrambling code conflict and an apparatus for determining a scrambling code conflict, so as to reduce a probability of call drop of a user equipment or a probability of cell update of a user equipment, and ensure that a service of the user equipment runs normally.

According to a first aspect, an embodiment of the present invention provides a method for determining a scrambling code conflict, including:

determining a serving cell existing before a handover of a user equipment fails, and determining a current serving cell of the user equipment; and comparing frequencies and scrambling codes of the current serving cell and a neighboring cell of the serving cell before the handover fails, and determining, according to a result of the comparing, that a scrambling code conflict exists between the current serving cell and the neighboring cell of the serving cell before the handover fails.

In a first possible implementation manner of the first aspect, the determining, according to a result of the comparing, that a scrambling code conflict exists between the current serving cell and the neighboring cell of the serving cell before the handover fails includes: if the result of the comparing is that the current serving cell and any neighboring cell of the serving cell before the handover fails are different cells with a same frequency and a same scrambling code, determining that the scrambling code conflict exists between the current serving cell and the neighboring cell of the serving cell before the handover fails.

With reference to the first aspect or the first possible implementation manner of the first aspect, in a second possible implementation manner, the method further includes: determining time at which the user equipment accesses the current serving cell, and determining time at which the handover of the user equipment fails; and if an interval between the time at which the user equipment accesses the current serving cell and the time at which the handover of the user equipment fails falls within a set range, executing the comparing step.

With reference to the first aspect, or the first and the second possible implementation manners of the first aspect, in a third possible implementation manner, the method further includes: modifying the scrambling code of the current serving cell; or modifying the scrambling code of the neighboring cell that is of the serving cell before the handover fails and has a scrambling code conflict with the current serving cell.

With reference to the first aspect, or the first, the second and the third possible implementation manners of the first aspect, in a fourth possible implementation manner, the method further includes: determining, according to the result of the comparing, that the current serving cell is a missing neighboring cell of the serving cell before the handover fails.

With reference to the first aspect, or the first, the second, the third and the fourth possible implementation manners of the first aspect, in a fifth possible implementation manner, the determining, according to the result of the comparing, that the current serving cell is a missing neighboring cell of the serving cell before the handover fails includes: if the result of the comparing is that the current serving cell and all neighboring cells of the serving cell before the handover fails are all different cells with different frequencies, determining that the current serving cell is a missing neighboring cell of the serving cell before the handover fails.

With reference to the first aspect, or the first, the second, the third, the fourth and the fifth possible implementation manners of the first aspect, in a sixth possible implementation manner, the method further includes: adding the current serving cell that is not configured as a neighboring cell of the serving cell before the handover fails.

With reference to the first aspect, or the first, the second, the third, the fourth, the fifth and the sixth possible implementation manners of the first aspect, in a seventh possible implementation manner, if the handover of the user equipment fails and the user equipment accesses the current serving cell in an access manner, the determining a serving cell before a handover of a user equipment fails includes: reading release block information of a circuit switch radio access bearer CS RAB or release block information of a packet switch radio access bearer PS RAB of the user equipment, where the release block information of the CS RAB or the release block information of the PS RAB includes identity information of a serving cell before call drop of the user equipment occurs.

With reference to the first aspect, or the first, the second, the third, the fourth, the fifth, the sixth and the seventh possible implementation manners of the first aspect, in an eighth possible implementation manner, the determining a current serving cell of the user equipment includes: determining, according to a radio resource control RRC access request sent by the user equipment, the current serving cell that is accessed by the user equipment after call drop of the user equipment occurs, where the RRC access request carries identity information of the current serving cell.

With reference to the first aspect, or the first, the second, the third, the fourth, the fifth, the sixth, the seventh and the eighth possible implementation manners of the first aspect, in a ninth possible implementation manner, if the handover of the user equipment fails and the user equipment is updated to the current serving cell in a cell update manner, the determining a serving cell before a handover of a user equipment fails includes: determining, according to a cell update message sent by the user equipment, a serving cell before cell update of the user equipment occurs, where the cell update message carries identity information of the serving cell before the handover fails.

With reference to the first aspect, or the first, the second, the third, the fourth, the fifth, the sixth, the seventh, the eighth and the ninth possible implementation manners of the first aspect, in a tenth possible implementation manner, the cell update message further includes cause information of cell update of the user equipment; if the cause information is any one of: a radio link RL failure, traffic radio bear reset TRB RST, and signaling radio bearer reset SRB RST, the comparing step is specifically: comparing frequencies and scrambling codes of the current serving cell and the handover target cell; and if a result of the comparing is that the frequencies and the scrambling codes of the current serving cell and the handover target cell are the same, determining that a scrambling code conflict exists between the current serving cell and the handover target cell.

With reference to the first aspect, or the first, the second, the third, the fourth, the fifth, the sixth, the seventh, the eighth, the ninth and the tenth possible implementation manners of the first aspect, in an eleventh possible implementation manner, the method further includes: receiving a measurement report of the current serving cell, where the measurement report is reported by the user equipment and carries frequency information and scrambling code information of the current serving cell; and determining a handover target cell, in the neighboring cell of the serving cell before the handover fails, for the user equipment.

According to a second aspect, an embodiment of the present invention further provides an apparatus for determining a scrambling code conflict, including:

a processor, configured to determine a serving cell before a handover of a user equipment fails, and determine a current serving cell of the user equipment, where the processor is further configured to compare frequencies and scrambling codes of the current serving cell and a neighboring cell of the serving cell before the handover fails, and determine, according to a result of the comparing, that a scrambling code conflict exists between the current serving cell and the neighboring cell of the serving cell before the handover fails.

In a first possible implementation manner of the second aspect, the processor is specifically configured to: if the result of the comparing is that the current serving cell and any neighboring cell of the serving cell before the handover fails are different cells with a same frequency and a same scrambling code, determine that the scrambling code conflict exists between the current serving cell and the neighboring cell of the serving cell before the handover fails.

With reference to the second aspect or the first possible implementation manner of the second aspect, in a second possible implementation manner, the processor is further configured to: determine time at which the user equipment accesses the current serving cell, and determine time at which the handover of the user equipment fails; and if an interval between the time at which the user equipment accesses the current serving cell and the time at which the handover of the user equipment fails falls within a set range, execute the comparing step.

With reference to the second aspect, or the first and the second possible implementation manners of the second aspect, in a third possible implementation manner, the processor is further configured to: modify the scrambling code of the current serving cell; or modify the scrambling code of the neighboring cell that is of the serving cell before the handover fails and has the scrambling code conflict with the current serving cell.

With reference to the second aspect, or the first, the second and the third possible implementation manners of the second aspect, in a fourth possible implementation manner, the processor is further configured to: determine, according to the result of the comparing, that the current serving cell is a missing neighboring cell of the serving cell before the handover fails.

With reference to the second aspect, or the first, the second, the third and the fourth possible implementation manners of the second aspect, in a fifth possible implementation manner, the processor is further configured to: if the result of the comparing is that the current serving cell and all neighboring cells of the serving cell before the handover fails are all different cells with different frequencies, determine that the current serving cell is the missing neighboring cell of the serving cell before the handover fails.

With reference to the second aspect, or the first, the second, the third, the fourth and the fifth possible implementation manners of the second aspect, in a sixth possible implementation manner, the processor is further configured to: add the current serving cell that is not configured as a neighboring cell of the serving cell before the handover fails.

With reference to the second aspect, or the first, the second, the third, the fourth, the fifth and the sixth possible implementation manners of the second aspect, in a seventh possible implementation manner, if the handover of the user equipment fails and the user equipment accesses the current serving cell in an access manner, the processor is specifically configured to: read release block information of a circuit switch radio access bearer CS RAB or release block information of a packet switch radio access bearer PS RAB of the user equipment, where the release block information of the CS RAB or the release block information of the PS RAB includes identity information of a serving cell before call drop of the user equipment occurs.

With reference to the second aspect, or the first, the second, the third, the fourth, the fifth, the sixth and the seventh possible implementation manners of the second aspect, in an eighth possible implementation manner, the processor is specifically configured to: determine, according to a radio resource control RRC access request sent by the user equipment, the current serving cell that is accessed by the user equipment after call drop of the user equipment occurs, where the RRC access request carries identity information of the current serving cell.

With reference to the second aspect, or the first, the second, the third, the fourth, the fifth, the sixth, the seventh and the eighth possible implementation manners of the second aspect, in a ninth possible implementation manner, the processor is specifically configured to: determine, according to a cell update message sent by the user equipment, a serving cell before cell update of the user equipment occurs, where the cell update message carries identity information of the serving cell before the handover fails.

With reference to the second aspect, or the first, the second, the third, the fourth, the fifth, the sixth, the seventh, the eighth and the ninth possible implementation manners of the second aspect, in a tenth possible implementation manner, the cell update message further includes cause information of cell update of the user equipment; if the cause information is any one of: an RL failure, TRB RST, and SRB RST, the comparing step executed by the processor is specifically: compare frequencies and scrambling codes of the current serving cell and the handover target cell; and if a result of the comparing is that the frequencies and the scrambling codes of the current serving cell and the handover target cell are the same, determine that a scrambling code conflict exists between the current serving cell and the handover target cell.

With reference to the second aspect, or the first, the second, the third, the fourth, the fifth, the sixth, the seventh, the eighth, the ninth and the tenth possible implementation manners of the second aspect, in an eleventh possible implementation manner, the apparatus further includes: a receiver, configured to receive a measurement report of the current serving cell, where the measurement report is reported by the user equipment and carries frequency information and scrambling code information of the current serving cell, where the processor is further configured to determine a handover target cell, in the neighboring cell of the serving cell before the handover fails, for the user equipment.

According to a third aspect, an embodiment of the present invention further provides an apparatus for determining a scrambling code conflict, including:

a determining unit, configured to determine a serving cell before a handover of a user equipment fails, and determine a current serving cell of the user equipment; and a comparing unit, configured to compare frequencies and scrambling codes of the current serving cell and a neighboring cell of the serving cell before the handover fails, where the determining unit is further configured to determine, according to a result of the comparing by the comparing unit, that a scrambling code conflict exists between the current serving cell and the neighboring cell of the serving cell before the handover fails.

In a first possible implementation manner of the third aspect, the determining unit is specifically configured to: if the result of the comparing by the comparing unit is that the current serving cell and any neighboring cell of the serving cell before the handover fails are different cells with a same frequency and a same scrambling code, determine that the scrambling code conflict exists between the current serving cell and the neighboring cell of the serving cell before the handover fails.

With reference to the third aspect or the first possible implementation manner of the third aspect, in a second possible implementation manner, the determining unit is further configured to: determine time at which the user equipment accesses the current serving cell, and determine time at which the handover of the user equipment fails; and if an interval between the time at which the user equipment accesses the current serving cell and the time at which the handover of the user equipment fails falls within a set range, the comparing unit executes the comparing step.

With reference to the third aspect, or the first and the second possible implementation manners of the third aspect, in a third possible implementation manner, the apparatus further includes: a first modifying unit, configured to modify the scrambling code of the current serving cell; or modify the scrambling code of the neighboring cell that is of the serving cell before the handover fails and has the scrambling code conflict with the current serving cell.

With reference to the third aspect, or the first, the second and the third possible implementation manners of the third aspect, in a fourth possible implementation manner, the determining unit is further configured to: determine, according to the result of the comparing by the comparing unit, that the current serving cell is a missing neighboring cell of the serving cell before the handover fails.

With reference to the third aspect, or the first, the second, the third and the fourth possible implementation manners of the third aspect, in a fifth possible implementation manner, the determining unit is specifically configured to: if the result of the comparing by the comparing unit is that the current serving cell and all neighboring cells of the serving cell before the handover fails are all different cells with different frequencies, determine that the current serving cell is the missing neighboring cell of the serving cell before the handover fails.

With reference to the third aspect, or the first, the second, the third, the fourth and the fifth possible implementation manners of the third aspect, in a sixth possible implementation manner, the apparatus further includes: a second modifying unit, configured to add the current serving cell that is not configured as a neighboring cell of the serving cell before the handover fails.

With reference to the third aspect, or the first, the second, the third, the fourth, the fifth and the sixth possible implementation manners of the third aspect, in a seventh possible implementation manner, if the handover of the user equipment fails and the user equipment accesses the current serving cell in an access manner, the determining unit is specifically configured to: read release block information of a circuit switch radio access bearer CS RAB or release block information of a packet switch radio access bearer PS RAB of the user equipment, where the release block information of the CS RAB or the release block information of the PS RAB includes identity information of a serving cell before call drop of the user equipment occurs.

With reference to the third aspect, or the first, the second, the third, the fourth, the fifth, the sixth and the seventh possible implementation manners of the third aspect, in an eighth possible implementation manner, the determining unit is specifically configured to: determine, according to a radio resource control RRC access request sent by the user equipment, the current serving cell that is accessed by the user equipment after call drop of the user equipment occurs, where the RRC access request carries identity information of the current serving cell.

With reference to the third aspect, or the first, the second, the third, the fourth, the fifth, the sixth, the seventh and the eighth possible implementation manners of the third aspect, in a ninth possible implementation manner, if the handover of the user equipment fails and the user equipment is updated to the current serving cell in a cell update manner, the determining unit is specifically configured to: determine, according to a cell update message sent by the user equipment, a serving cell before cell update of the user equipment occurs, where the cell update message carries identity information of the serving cell before the handover fails.

With reference to the third aspect, or the first, the second, the third, the fourth, the fifth, the sixth, the seventh, the eighth and the ninth possible implementation manners of the third aspect, in a tenth possible implementation manner, the cell update message further includes cause information of cell update of the user equipment; if the cause information is any one of: an RL failure, TRB RST, and SRB RST, the comparing step executed by the comparing unit is specifically: compare frequencies and scrambling codes of the current serving cell and the handover target cell; and if a result of the comparing is that the frequencies and the scrambling codes of the current serving cell and the handover target cell are the same, determining that a scrambling code conflict exists between the current serving cell and the handover target cell.

With reference to the third aspect, or the first, the second, the third, the fourth, the fifth, the sixth, the seventh, the eighth, the ninth and the tenth possible implementation manners of the third aspect, in an eleventh possible implementation manner, the apparatus further includes: a receiving unit, configured to receive a measurement report of the current serving cell, where the measurement report is reported by the user equipment and carries frequency information and scrambling code information of the current serving cell, where the determining unit is further configured to determine a handover target cell, in the neighboring cell of the serving cell before the handover fails, for the user equipment.

According to the method for determining a scrambling code conflict and the apparatus for determining a scrambling code conflict provided in the embodiments of the present invention, a serving cell before a handover of a user equipment fails and a current serving cell that is accessed by the user equipment after the handover fails are separately determined, and frequencies and scrambling codes of the current serving cell and a neighboring cell of the serving cell before the handover fails are compared to determine that a scrambling code conflict exists between the current serving cell and the neighboring cell of the serving cell before the handover fails. This reduces a probability of a handover failure of the user equipment, further reduces a probability of call drop or a probability of cell update, and ensures that a service of the user equipment runs normally.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Technologies described in this specification may be applied to various communications systems that have a problem of scrambling code conflict or a missing configuration of a neighboring cell, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and other communications systems.

The user equipment involved in this application may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, a user device, or a user equipment.

The following method embodiments may be executed by a base station controller, for example, may be a base station controller (BSC) in a GSM or CDMA system, or may be a radio network controller (RNC) in a WCDMA system, or may be a base station in various communications systems, for example, an eNodeB in an LTE system, or may be a centralized server or the like in various communications systems, which is not limited in this application.

Figure 1:
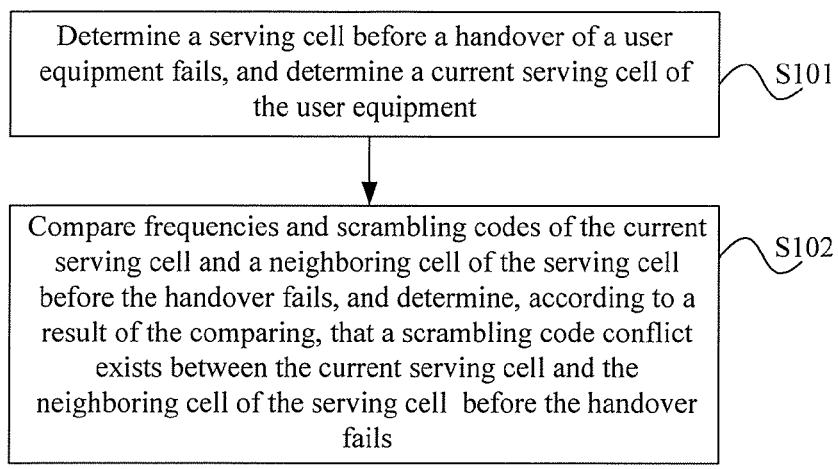
FIG. 1 is a flowchart of an embodiment of a method for determining a scrambling code conflict according to the present invention.

FIG. 1 is a flowchart of an embodiment of a method for determining a scrambling code conflict according to the present invention. As shown in FIG. 1, the method includes:

S101. Determine a serving cell before a handover of a user equipment fails, and determine a current serving cell of the user equipment.

S102. Compare frequencies and scrambling codes of the current serving cell and a neighboring cell of the serving cell before the handover fails, and determine, according to a result of the comparing, that a scrambling code conflict exists between the current serving cell and the neighboring cell of the serving cell before the handover fails.

Involved in this embodiment of the present invention, the serving cell before the handover of the user equipment fails may be a cell in which a call behavior is performed before call drop or cell update of the user equipment occurs, and one or more neighboring cells may be configured for the serving cell before the handover of the user equipment fails. Configuration information of the serving cell before the handover of the user equipment fails may include a neighboring cell list, including identity information of a neighboring cell of the serving cell before the handover fails and information about a frequency (namely, frequency channel number) and a scrambling code of the neighboring cell.

Before the handover fails, the user equipment may report, to the serving cell before the handover fails, a measurement report in a process of performing the call behavior, where the measurement report may carry information about a frequency channel number and a scrambling code of another neighboring cell, which is generally a neighboring cell of the serving cell. The serving cell before the handover fails may select, according to the measurement report reported by the user equipment, a handover target cell for the user equipment. However, because a scrambling code conflict may exist between a neighboring cell of the serving cell before the handover fails and the handover target cell, which specifically refers to that: A neighboring cell of the serving cell before the handover fails and the handover target cell are cells with a same frequency and a same scrambling code. The scrambling code conflict may cause that when the user equipment is handed over to the handover target cell, a handover fails, and a call drop phenomenon or cell update occurs.

The current serving cell of the user equipment involved in this embodiment of the present invention may be a serving cell that is re-accessed by the user equipment after a handover fails. Specifically, after a handover of the user equipment fails, call drop may occur, and the user equipment may access the current serving cell by initiating an RRC access request, or after a handover of the user equipment fails, cell update may be performed, where the user equipment is updated to the current serving cell.

In an implementation scenario in which a handover fails and a call drop phenomenon occurs when the user equipment is handed over to a target cell, identity information of a primary serving cell before call drop of the user equipment occurs may be read, where the identity information of the primary serving cell is included in release block information of a circuit switch radio access bearer (CS RAB) or release block information of a packet switch radio access bearer (PS RAB) of the user equipment. Carried identity information of the current serving cell may be obtained from a radio resource control (RRC) access request that is re-initiated after call drop of the user equipment occurs, where the current serving cell is a cell that is re-accessed after a user handover fails.

In an implementation scenario in which a handover fails and a cell update phenomenon occurs when the user equipment is handed over to a target cell, identity information of a serving cell before the handover fails may be obtained from a cell update message sent by the user equipment, where the identity information of the serving cell is carried in the cell update message. If cell update of the user equipment succeeds, identity information of a current serving cell that is newly accessed after cell update of the user equipment is completed may further be obtained.

Further, frequencies and scrambling codes of the current serving cell and the serving cell before the handover of the user equipment fails may be compared, and it is determined, according to a result of the comparing, that a scrambling code conflict exists between the current serving cell and the neighboring cell of the serving cell before the handover fails.

The serving cell before the handover of the user equipment fails and a current serving cell that is accessed after the handover fails may be determined according to an international mobile subscriber identity (IMSI) of the user equipment. A frequency channel number and a scrambling code of the neighboring cell of the serving cell before the handover fails may be determined according to the configuration information of the serving cell before the handover fails. Whether the neighboring cell and the current serving cell are a same cell is determined by using a global cell identity (GCI).

If the current serving cell of the user equipment and a neighboring cell in neighboring cells of the serving cell before the handover fails are different cells with a same frequency and a same scrambling code, it may be determined that a scrambling code conflict exists between the current serving cell of the user equipment and the neighboring cell of the serving cell before the handover fails.

It should be noted that, in a scenario in which a scrambling code conflict exists between the current serving cell and the neighboring cell of the serving cell before the handover fails, the neighboring cell that is of the serving cell before the handover fails and has a scrambling code conflict with the current serving cell is a handover target cell when the handover fails. Therefore, whether a scrambling code conflict exists may also be determined by determining whether the handover target cell when the handover fails and the current serving cell are different cells with a same frequency and a same scrambling code.

The following uses a specific example for description: It is assumed that a serving cell before a handover fails when a user equipment is handed over to a handover target cell is a cell CellA, that is, a serving cell before call drop or cell update of the user equipment occurs. A neighbor relationship has been configured for a CellB and the CellA, and no neighbor relationship exists between the CellA and a CellC. The CellB and the CellC have a same frequency channel number f1 and a same scrambling code PSC 1.

A call behavior is performed in the CellA before call drop or cell update of the user equipment occurs, that is, the CellA is a serving cell before a handover of the user equipment fails. After receiving a measurement report from the CellC, the user equipment reports the measurement report to an RNC, where the measurement report includes the frequency channel number f1 and the scrambling code PSC 1 of the CellC. Because a neighboring cell of the CellA includes the CellB, and a frequency channel number of the CellB is f1 and a scrambling code of the CellB is PSC 1, the RNC can determine that the user equipment is handed over to the CellB, that is, a handover target cell is the CellB. It can be learned that, because the CellB and the CellC are different cells with a same frequency and a same scrambling code, the RNC cannot distinguish a cell from which the measurement report actually comes. As a result, the handover target cell may be falsely determined by the RNC. Further, a link failure of the user equipment may be caused by that the RNC instructs the user equipment to hand over to the CellB, and call drop or cell update of the user equipment is caused.

The RNC may record IMSI information of the user equipment before call drop or cell update of the user equipment occurs, the serving cell (namely, the CellA) before call drop or cell update of the user equipment occurs, and the handover target cell (namely, the CellB). If the user equipment successfully initiates a cell update or RRC access request within a given time, the RNC may record the IMSI information of the user equipment (to determine that the IMSI information corresponds to a same user equipment before call drop or cell update occurs and after RRC access or cell update occurs) and a current serving cell (namely, the CellC) after RRC access or cell update occurs.

If the current serving cell (the CellC) after RRC access or cell update of the user equipment occurs and the handover target cell (the CellB) that is determined by the RNC are different cells (which may be determined by using a GCI) with a same frequency and a same scrambling code, it may be determined that a scrambling code conflict exists between the CellC and the CellB.

Optionally, whether an interval between time at which the user equipment accesses the current serving cell and time at which the handover of the user equipment fails (that is, call drop or cell update occurs) falls within a set range may further be determined, where the time at which call drop or cell update occurs may be obtained from, for example, release block information of a CS RAB or release block information of a PS RAB of the user equipment. The time at which the user equipment accesses the current serving cell may be queried according to an IMSI of the user equipment. If the interval between the time at which the user equipment accesses the current serving cell and the time at which call drop or cell update of the user equipment occurs falls within a set range, it may be determined that a scrambling code conflict exits between the current serving cell and a neighboring cell of the serving cell before the handover fails.

For an implementation scenario in which there is a cell having a scrambling code conflict with a primary serving cell, a probability of a handover failure of a user equipment can be reduced by modifying a current serving cell and a neighboring cell that is of a serving cell before a handover fails and has a scrambling code conflict with the current serving cell, so as to reduce a probability of call drop of the user equipment or a probability of cell update of the user equipment, thereby ensuring that a service of the user equipment runs normally.

Further, it may further be determined, according to a result of comparing, that the current serving cell is a missing neighboring cell of the serving cell before the handover fails. Specifically, if the current serving cell and all neighboring cells of the serving cell before the handover fails are all different cells with different frequencies, it may be determined that the current serving cell is a missing neighboring cell of the serving cell before the handover fails.

Optionally, after it is determined that the current serving cell is a missing neighboring cell of the serving cell before the handover fails, for an implementation scenario in which there is a missing neighboring cell of the primary serving cell, a probability of a handover failure of a user equipment can be reduced in a manner of adding the missing neighboring cell for the primary serving cell, so as to reduce a probability of call drop of the user equipment or a probability of cell update of the user equipment, that is, to add the current serving cell that is not configured as a neighboring cell of the serving cell before the handover fails, thereby ensuring that a service of the user equipment runs normally.

It should be noted that, this embodiment of the present invention may be used for detecting a scrambling code conflict and a missing configuration of a neighboring cell in a WCDMA system. It may be understood that, this embodiment of the present invention is also applicable to various other communications systems that have a problem of a scrambling code conflict or a missing configuration of a neighboring cell, for example, may be used for conflict detection of an intra-frequency physical cell identifier (PCI) in an LTE system, or conflict detection of an intra-frequency broadcast control channel (BCCH) in a GSM system and an intra-frequency base transceiver station identity code (BSIC), and details are not described herein again.

According to the method for determining a scrambling code conflict provided in this embodiment, a serving cell before a handover of a user equipment fails and a current serving cell that is accessed by the user equipment after the handover fails are separately determined; and frequencies and scrambling codes of the current serving cell and a neighboring cell of the serving cell before the handover fails are compared to determine that a scrambling code conflict exists between the current serving cell and the neighboring cell of the serving cell before the handover fails, thereby reducing a probability of a handover failure of the user equipment, further reducing a probability of call drop or a probability of cell update, and ensuring that a service of the user equipment runs normally.

Figure 2:
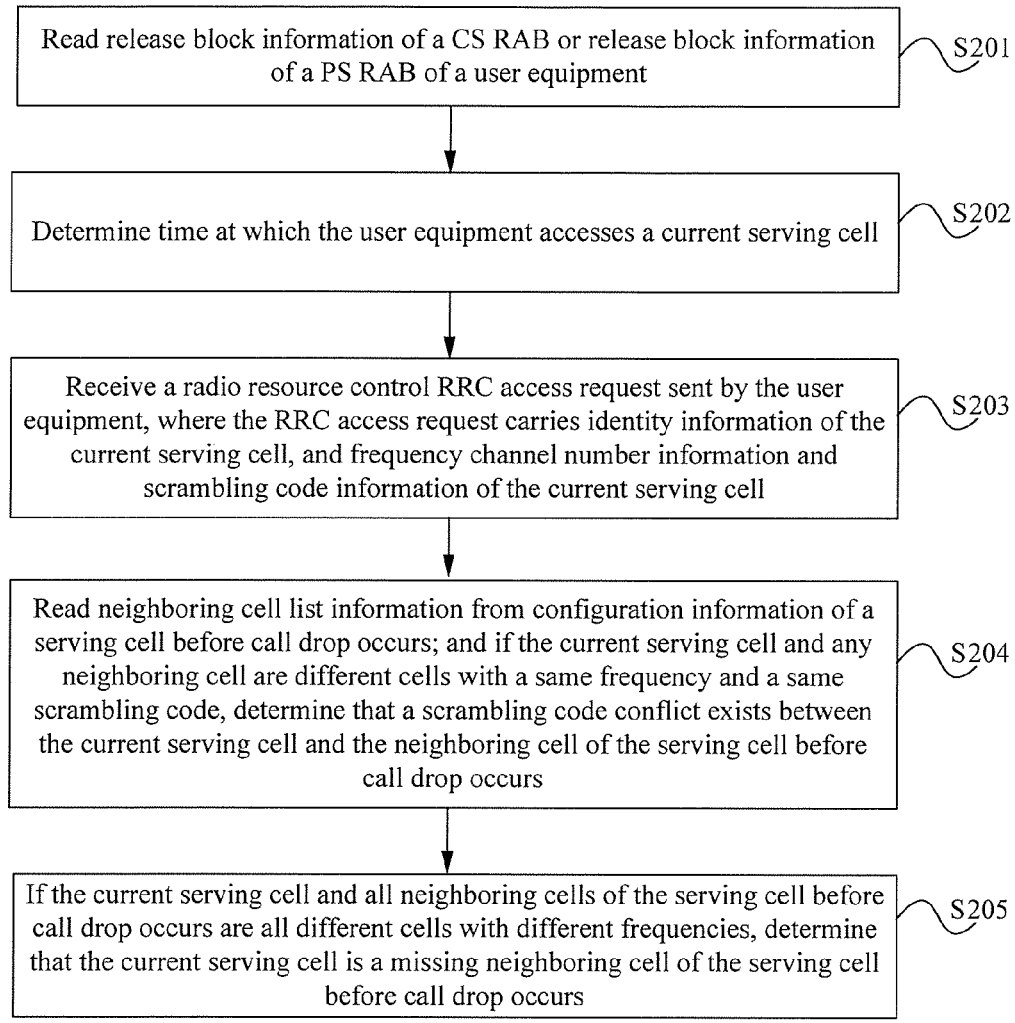
FIG. 2 is a flowchart of another embodiment of a method for determining a scrambling code conflict according to the present invention.

FIG. 2 is a flowchart of another embodiment of a method for determining a scrambling code conflict according to the present invention. As shown in FIG. 2, this embodiment is described by using a scenario in which a scrambling code conflict causes that a handover of a user equipment fails, and further causes that call drop of the user equipment occurs and the user equipment reinitiates a call to access a current serving cell as an example. The method includes:

S201. Read release block information of a CS RAB or release block information of a PS RAB of a user equipment, where the release block information of the CS RAB or the release block information of the PS RAB includes identity information of a serving cell before call drop of the user equipment occurs and information about time at which call drop of the user equipment occurs.

The serving cell before call drop of the user equipment occurs is a serving cell before a handover of the user equipment involved in this embodiment of the present invention fails.

Release information of this call is recorded in the release block of the CS RAB or the release block of the PS RAB. If release is displayed as abnormal release (call drop of the user equipment involved in this embodiment of the present invention), identity information of a serving cell before abnormal release of the user equipment occurs may be obtained from the release block of the CS RAB or the release block of the PS RAB, and time at which abnormal release occurs may further be obtained, for example, RAB release time=T1 may be used for identification, and IMSI information of the user equipment may further be obtained.

S202. Determine time at which the user equipment accesses a current serving cell.

Specifically, whether the user equipment initiates an RRC call connection request within time Thd_n (a default value of Thd_n may be set, for example, 30 s) may be queried by using an IMSI of the user equipment. If Thd_n exceeds 30 s, a call record may be discarded, that is, an operation after S202 is not performed. That is, when an interval between the time at which the user equipment accesses the current serving cell and time at which call drop of the user equipment occurs falls within a set range, it may be determined that a scrambling code conflict exits between the current serving cell and a neighboring cell of the serving cell before call drop occurs.

S203. Receive a radio resource control RRC access request sent by the user equipment, where the RRC access request carries identity information of the current serving cell, and frequency channel number information and scrambling code information of the current serving cell.

S204. Read neighboring cell list information from configuration information of the serving cell before call drop occurs; and if the current serving cell and any neighboring cell are different cells with a same frequency and a same scrambling code, determine that a scrambling code conflict exists between the current serving cell and a neighboring cell of the serving cell before call drop occurs.

Specifically, the neighboring cell list information in the configuration information of the serving cell before call drop occurs includes: a set L={Celli, . . . , Celln} including a list of intra-frequency and inter-frequency neighboring cells that are in a same system as a primary serving cell, and frequency channel number information and scrambling code information that are of each neighboring cell and included in the set L, X={(fi, PSCi), . . . , (fn, PSCn)}; if a frequency channel number and a scrambling code of the current serving cell are (f2, PSC2), and if (fi, PSCi)=(f2, PSC2) exists in the set X, a scrambling code conflict exists between the current serving cell and the neighboring cell of the serving cell before call drop occurs, where a frequency channel number and a scrambling code of the neighboring cell are (fi, PSCi).

S205. If the current serving cell and all neighboring cells of the serving cell before call drop occurs are all different cells with different frequencies, determine that the current serving cell is a missing neighboring cell of the serving cell before call drop occurs.

It should be noted that, if a list of the neighboring cells includes a list of first-order neighboring cells, that is, the list of the neighboring cells includes a list {Celli, . . . , Celln} of intra-frequency and inter-frequency neighboring cells that are in a same system as the serving cell before call drop occurs, and does not include a list of neighboring cells that are in a different system from the serving cell before call drop occurs, or frequency channel numbers and scrambling codes of the first-order neighboring cells X={(fi, PSCi), . . . , (fn, PSCn)}; if a frequency channel number and a scrambling code of the current serving cell are (f1, PSC1), and if (f1, PSC1) is not equal to any (fi, PSC1) in the set X and an ID of the current serving cell does not exist in {Celli, . . . , Celln}, the current serving cell is a missing neighboring cell of the serving cell before call drop occurs.

According to the method for determining a scrambling code conflict provided in the embodiment, because a scrambling code conflict causes that a handover of a user equipment fails and causes that call drop of the user equipment occurs, a serving cell before the handover of the user equipment fails and a current serving cell that is accessed by the user equipment after the handover fails are separately determined; and frequencies and scrambling codes of the current serving cell and a neighboring cell of the serving cell before the handover fails are compared; it is determined, according to a result of the comparing, that a scrambling code conflict exists between the current serving cell and the neighboring cell of the serving cell before the handover fails; and further, an operation of modifying the scrambling code of the current serving cell or the scrambling code of the neighboring cell that has a scrambling code conflict may be performed; or a missing neighboring cell is added for the serving cell before the handover fails, thereby reducing a probability of a handover failure of the user equipment, further reducing a probability of call drop of the user equipment, and ensuring that a service of the user equipment runs normally.

Figure 3:
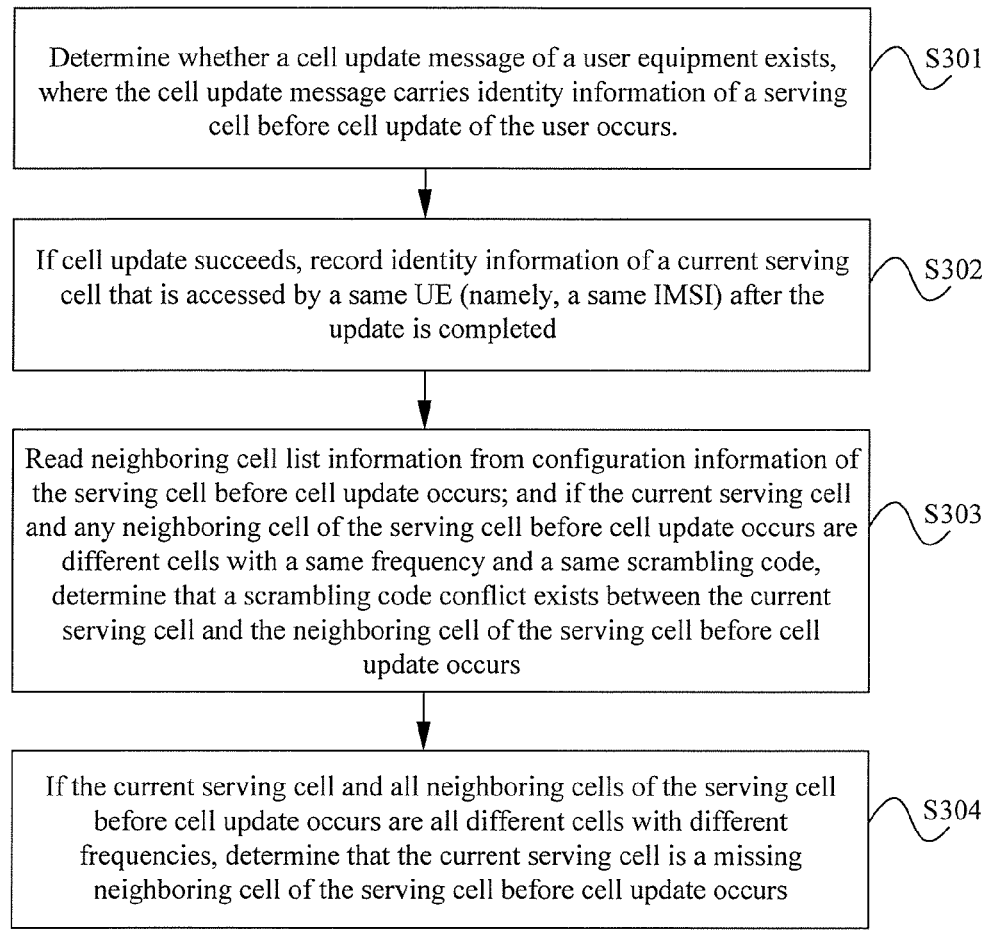
FIG. 3 is a flowchart of still another embodiment of a method for determining a scrambling code conflict according to the present invention.

FIG. 3 is a flowchart of still another embodiment of a method for determining a scrambling code conflict according to the present invention. As shown in FIG. 3, this embodiment is described by using a scenario in which a scrambling code conflict causes a handover failure of a user equipment and causes cell update of the user equipment as an example. The method includes:

S301. Determine whether a cell update message of the user equipment exists, where the cell update message carries identity information of a serving cell before cell update of the user occurs.

The serving cell before cell update of the user equipment occurs is a serving cell before the handover failure of the user equipment involved in this embodiment of the present invention.

The cell update message further includes cause information.

Optionally, if the cause information is not any one of: a radio link (RL) failure, traffic radio bear reset (TRB RST), and signaling radio bearer reset (SRB RST), the cell update message may be discarded, and steps after S301 are not performed.

If the cause information is any one of: an RL failure, TRB RST, or SRB RST, frequencies and scrambling codes of a current serving cell and a handover target cell may be compared; and if a result of the comparing is that the frequencies and the scrambling codes of the current serving cell and the handover target cell are the same, it is determined that a scrambling code conflict exists between the current serving cell and the handover target cell.

The serving cell before cell update of the user equipment occurs is determined according to a cell update message sent by the user equipment, where the cell update message carries the identity information of the serving cell before cell update of the user equipment occurs.

S302. If cell update succeeds, record identity information of a current serving cell that is accessed by a same UE (namely, a same IMSI) after the update is completed.

S303. Read neighboring cell list information from configuration information of the serving cell before cell update occurs; and if the current serving cell and any neighboring cell of the serving cell before cell update occurs are different cells with a same frequency and a same scrambling code, determine that a scrambling code conflict exists between the current serving cell and the neighboring cell of the serving cell before cell update occurs.

For a specific process of S303, refer to related descriptions in S204, and details are not described herein again.

S304. If the current serving cell and all neighboring cells of the serving cell before cell update occurs are all different cells with different frequencies, determine that the current serving cell is a missing neighboring cell of the serving cell before cell update occurs.

For a specific process of S304, refer to related descriptions in S205, and details are not described herein again.

According to the method for determining a scrambling code conflict provided in the embodiment, because a scrambling code conflict causes that a handover of a user equipment fails and cell update is performed, a serving cell before the handover of the user equipment fails and a current serving cell that is accessed by the user equipment after the handover fails are separately determined; frequencies and scrambling codes of the current serving cell and a neighboring cell of the serving cell before the handover fails are compared; it is determined, according to a result of the comparing, that a scrambling code conflict exists between the current serving cell and the neighboring cell of the serving cell before the handover fails; and further, an operation of modifying the scrambling code of the current serving cell or the scrambling code of the neighboring cell that has a scrambling code conflict may be performed; or a missing neighboring cell is added for the serving cell before the handover fails, thereby reducing a probability of a handover failure of the user equipment, further reducing a probability of cell update of the user equipment, and ensuring that a service of the user equipment runs normally.

Figure 4:
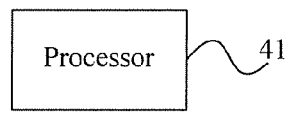
FIG. 4 is a schematic structural diagram of an embodiment of an apparatus for determining a scrambling code conflict according to the present invention.

FIG. 4 is a schematic structural diagram of an embodiment of an apparatus for determining a scrambling code conflict according to the present invention. As shown in FIG. 4, the apparatus for determining a scrambling code conflict includes: a processor 41.

The processor 41 is configured to determine a serving cell before a handover of a user equipment fails, and determine a current serving cell of the user equipment.

The processor 41 is further configured to compare frequencies and scrambling codes of the current serving cell and a neighboring cell of, the serving cell before the handover fails, and determine, according to a result of the comparing, that a scrambling code conflict exists between the current serving cell and the neighboring cell of the serving cell before the handover fails.

Optionally, the processor 41 may be specifically configured to: if the result of the comparing is that the current serving cell and any neighboring cell of the serving cell before the handover fails are different cells with a same frequency and a same scrambling code, determine that the scrambling code conflict exists between the current serving cell and the neighboring cell of the serving cell before the handover fails.

Optionally, the processor 41 may further be configured to: determine time at which the user equipment accesses the current serving cell, and determine time at which the handover of the user equipment fails; and if an interval between the time at which the user equipment accesses the current serving cell and the time at which the handover of the user equipment fails falls within a set range, execute the comparing step.

Optionally, the processor 41 may further be configured to: modify the scrambling code of the current serving cell; or modify the scrambling code of the neighboring cell that is of the serving cell before the handover fails and has the scrambling code conflict with the current serving cell.

Optionally, the processor 41 may further be configured to: determine, according to the result of the comparing, that the current serving cell is a missing neighboring cell of the serving cell before the handover fails.

Optionally, the processor 41 may further be configured to: if the result of the comparing is that the current serving cell and all neighboring cells of the serving cell before the handover fails are all different cells with different frequencies, determine that the current serving cell is the missing neighboring cell of the serving cell before the handover fails.

Optionally, the processor 41 may further be configured to: add the current serving cell that is not configured as a neighboring cell of the serving cell before the handover fails.

Optionally, if the handover of the user equipment fails and the user equipment accesses the current serving cell in an access manner, the processor 41 may be specifically configured to: read release block information of a circuit switch radio access bearer CS RAB or release block information of a packet switch radio access bearer PS RAB of the user equipment, where the release block information of the CS RAB or the release block information of the PS RAB includes identity information of a serving cell before call drop of the user equipment occurs.

Optionally, the processor 41 may further be specifically configured to determine, according to a radio resource control RRC access request sent by the user equipment, a current serving cell that is accessed after call drop of the user equipment occurs, where the RRC access request carries identity information of the current serving cell.

Optionally, if a handover of the user equipment fails and the user equipment accesses the current serving cell in an access manner, the processor 41 may further be specifically configured to: determine, according to a cell update message sent by the user equipment, a serving cell before cell update of the user equipment occurs, where the cell update message carries identity information of the serving cell before the handover fails.

Optionally, the cell update message further includes cause information of cell update of the user equipment; if the cause information is any one of: an RL failure, TRB RST, and SRB RST, the comparing step executed by the processor 41 is specifically: compare frequencies and scrambling codes of the current serving cell and a handover target cell; and if a result of the comparing is that the frequencies and the scrambling codes of the current serving cell and the handover target cell are the same, determine that a scrambling code conflict exists between the current serving cell and the handover target cell.

Figure 5:
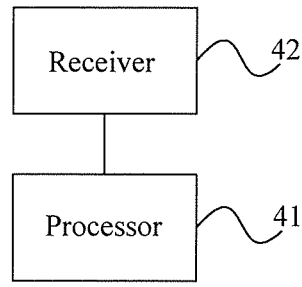
FIG. 5 is a schematic structural diagram of another embodiment of an apparatus for determining a scrambling code conflict according to the present invention.

FIG. 5 is a schematic structural diagram of another embodiment of an apparatus for determining a scrambling code conflict according to the present invention. As shown in FIG. 5, on the basis of the embodiment shown in FIG. 4, the apparatus for determining a scrambling code conflict may further include:

a receiver 42, configured to receive a measurement report of the current serving cell, where the measurement report is reported by the user equipment and carries frequency information and scrambling code information of the current serving cell.

Optionally, the processor 41 is further configured to determine a handover target cell, in the neighboring cell of the serving cell before the handover fails, for the user equipment.

The apparatus for determining a scrambling code conflict provided in this embodiment may be a base station controller, for example, may be a BSC in a GSM or CDMA system, may be an RNC in a WCDMA system, or may be a base station in various communications systems, for example, an eNodeB in an LTE system, or may be an apparatus, such as a centralized server, in various communications systems.

The apparatus for determining a scrambling code conflict is a device that performs the method for determining a scrambling code conflict provided in the embodiments of the present invention. For a specific process and function of performing, by the apparatus, the method for determining a scrambling code conflict, refer to related descriptions in the method embodiments shown in FIG. 1 to FIG. 3, and details are not described herein again.

Figure 6:
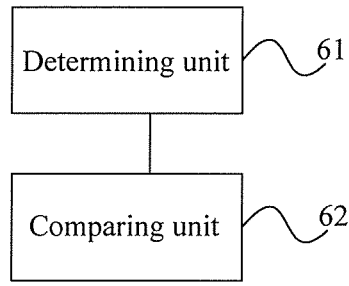
FIG. 6 is a schematic structural diagram of still another embodiment of an apparatus for determining a scrambling code conflict according to the present invention.

FIG. 6 is a schematic structural diagram of still another embodiment of an apparatus for determining a scrambling code conflict according to the present invention. As shown in FIG. 6, the apparatus for determining a scrambling code conflict includes: a determining unit 61 and a comparing unit 62.

The determining unit 61 is configured to determine a serving cell before a handover of a user equipment fails, and determine a current serving cell of the user equipment.

The comparing unit 62 is configured to compare frequencies and scrambling codes of the current serving cell and a neighboring cell of the serving cell before the handover fails.

The determining unit 61 is further configured to determine, according to a result of the comparing by the comparing unit 62, that a scrambling code conflict exists between the current serving cell and the neighboring cell of the serving cell before the handover fails.

Optionally, the determining unit 61 may be specifically configured to: if the result of the comparing by the comparing unit 62 is that the current serving cell and any neighboring cell of the serving cell before the handover fails are different cells with a same frequency and a same scrambling code, determine that the scrambling code conflict exists between the current serving cell and the neighboring cell of the serving cell before the handover fails.

Optionally, the determining unit 61 may further be configured to: determine time at which the user equipment accesses the current serving cell, and determine time at which the handover of the user equipment fails; and if an interval between the time at which the user equipment accesses the current serving cell and the time at which the handover of the user equipment fails falls within a set range, the comparing unit 62 executes the comparing step.

Figure 7:
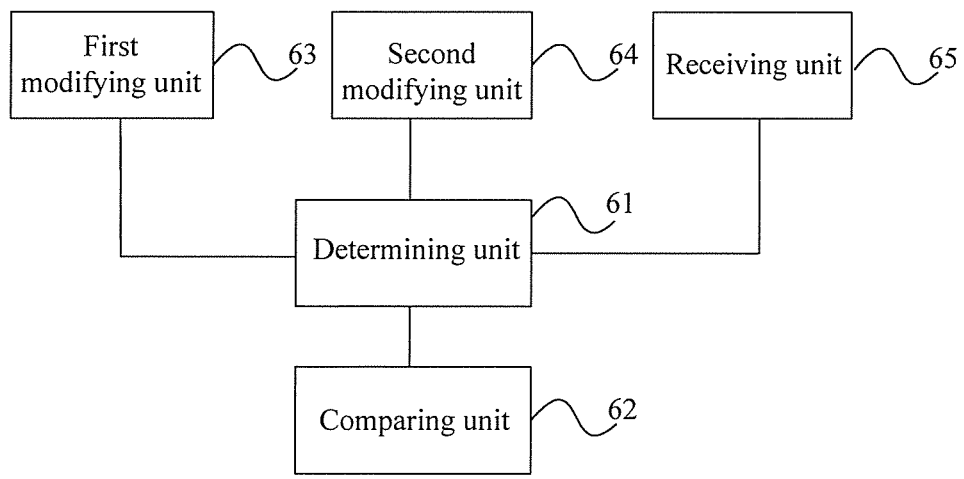
FIG. 7 is a schematic structural diagram of yet another embodiment of an apparatus for determining a scrambling code conflict according to the present invention.

FIG. 7 is a schematic structural diagram of yet another embodiment of an apparatus for determining a scrambling code conflict according to the present invention. As shown in FIG. 7, on the basis of the embodiment shown in FIG. 6, the apparatus for determining a scrambling code conflict may further include:

a first modifying unit 63, configured to modify the scrambling code of the current serving cell; or modify the scrambling code of the neighboring cell that is of the serving cell before the handover fails and has the scrambling code conflict with the current serving cell.

Optionally, the determining unit 61 may further be configured to: determine, according to the result of the comparing by the comparing unit 62, that the current serving cell is a missing neighboring cell of the serving cell before the handover fails.

Optionally, the determining unit 61 may further be configured to: if the result of the comparing by the comparing unit 62 is that the current serving cell and all neighboring cells of the serving cell before the handover fails are all different cells with different frequencies, determine that the current serving cell is the missing neighboring cell of the serving cell before the handover fails.

Optionally, the apparatus may further include a second modifying unit 64, configured to add the current serving cell that is not configured as a neighboring cell of the serving cell before the handover fails.

Optionally, if the handover of the user equipment fails and the user equipment accesses the current serving cell in an access manner, the determining unit 61 may be specifically configured to: read release block information of a circuit switch radio access bearer CS RAB or release block information of a packet switch radio access bearer PS RAB of the user equipment, where the release block information of the CS RAB or the release block information of the PS RAB includes identity information of a serving cell before call drop of the user equipment occurs.

Optionally, the determining unit 61 may be specifically configured to: determine, according to a radio resource control RRC access request sent by the user equipment, a current serving cell that is accessed by the user equipment after call drop of the user equipment occurs, where the RRC access request carries identity information of the current serving cell.

Optionally, if the handover of the user equipment fails and the user equipment is updated to the current serving cell in a cell update manner, the determining unit 61 may be specifically configured to: determine, according to a cell update message sent by the user equipment, a serving cell before cell update of the user equipment occurs, where the cell update message carries identity information of the serving cell before the handover fails.

Optionally, the cell update message further includes cause information of cell update of the user equipment; if the cause information is any one of: an RL failure, TRB RST, and SRB RST, the comparing step that may be executed by the comparing unit 62 is specifically: compare frequencies and scrambling codes of the current serving cell and a handover target cell; and if a result of the comparing is that the frequencies and the scrambling codes of the current serving cell and the handover target cell are the same, determine that a scrambling code conflict exists between the current serving cell and the handover target cell.

Optionally, the apparatus may further include:

a receiving unit 65, configured to receive a measurement report of the current serving cell, where the measurement report is reported by the user equipment and carries frequency information and scrambling code information of the current serving cell, where the determining unit 61 may further be configured to determine a handover target cell, in the neighboring cell of the serving cell before the handover fails, for the user equipment.

The apparatus for determining a scrambling code conflict provided in this embodiment may be a base station controller, for example, may be a BSC in a GSM or CDMA system, may be an RNC in a WCDMA system, or may be a base station in various communications systems, for example, an eNodeB in an LTE system, or may be an apparatus, such as a centralized server, in various communications systems.

The apparatus for determining a scrambling code conflict is a device that performs the method for determining a scrambling code conflict provided in the embodiments of the present invention. For a specific process and function of performing, by the apparatus, the method for determining a scrambling code conflict, refer to related descriptions in the method embodiments shown in FIG. 1 to FIG. 3, and details are not described herein again.

It can be clearly understood by persons skilled in the art that, for the purpose of convenient and brief description, division of the foregoing function modules is merely used as an example for illustration, in an actual application, the foregoing functions may be assigned to different modules for implementation according to a need, that is, an inner structure of an apparatus is divided into different function modules to implement all or part of the functions described in the foregoing. For a detailed working process of the foregoing system, apparatus, and unit, reference may be made to a corresponding process in the foregoing method embodiments, and details are not described herein again. In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected as required to achieve the objectives of the solutions of the embodiments.

In addition, functional units in the embodiments of the present application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof; however, these modifications or equivalent replacements do not make the essence of corresponding technical solutions depart from the scope of the technical solutions in the embodiments of the present application.

What is claimed is:

1. A method for determining a scrambling code conflict, the method comprising:
    determining a previous serving cell of a user equipment before a handover of the user equipment fails, and determining a current serving cell of the user equipment after the handover; and
    comparing frequencies and scrambling codes of the current serving cell and a neighboring cell of the previous serving cell, and determining, according to a result of the comparing, that a scrambling code conflict exists between the current serving cell and the neighboring cell of the previous serving cell.

2. The method according to claim 1, wherein determining, according to a result of the comparing, that a scrambling code conflict exists between the current serving cell and the neighboring cell of the previous serving cell comprises:
    if the result of the comparing is that the current serving cell and any neighboring cell of the previous serving cell are different cells with a same frequency and a same scrambling code, determining that the scrambling code conflict exists between the current serving cell and the neighboring cell of the previous serving cell.

3. The method according to claim 1, wherein the method further comprises:
    determining a time at which the user equipment accesses the current serving cell, and determining a time at which the handover of the user equipment fails; and
    if an interval between the time at which the user equipment accesses the current serving cell and the time at which the handover of the user equipment fails falls within a set range, executing the comparing step.

4. The method according to claim 1, wherein the method further comprises:
    determnining, according to the result of the comparing, that the current serving cell is a missing neighboring cell of the previous serving cell.

5. The method according to claim 4, wherein determining, according to the result of the comparing, that the current serving cell is a missing neighboring cell of the previous serving cell comprises:
    if the result of the comparing is that the current serving cell and all neighboring cells of the previous serving cell are all different cells with different frequencies, determining that the current serving cell is the missing neighboring cell of the previous serving cell.

6. The method according to claim 1, wherein if the handover of the user equipment fails and the user equipment accesses the current serving cell in an access manner, determining the previous serving cell comprises:
    reading release block information of a circuit switch radio access bearer (CS RAB) or release block information of a packet switch radio access bearer (PS RAB) of the user equipment, wherein the release block information of the CS RAB or the release block information of the PS RAB comprises identity information of a serving cell before a call drop of the user equipment occurs.

7. The method according to claim 6, wherein determining the current serving cell of the user equipment comprises:
    determining, according to a radio resource control (RRC) access request sent by the user equipment, the current serving cell that is accessed by the user equipment after the call drop of the user equipment occurs, wherein the RRC access request carries identity information of the current serving cell.

8. The method according to claim 1, wherein if the handover of the user equipment fails and the user equipment is updated to the current serving cell in a cell update manner, the determining of the previous serving cell comprises:
    determining, according to a cell update message sent by the user equipment, a serving cell before a cell update of the user equipment occurs, wherein the cell update message carries identity information of the previous serving cell.

9. The method according to claim 7, wherein:
the cell update message further comprises cause information of a cell update of the user equipment;
if the cause information is any one of: a radio link (RL) failure, traffic radio bear reset (TRB RST), and signaling radio bearer reset (SRB RST), the comparing step comprises:
comparing frequencies and scrambling codes of the current serving cell and a handover target cell;
and if a result of the comparing is that the frequencies and the scrambling codes of the current serving cell and the handover target cell are the same, determimining that a scrambling code conflict exists between the current serving cell and the handover target cell.

10. The method according to claim 1, wherein the method further comprises:
receiving a measurement report of the current serving cell, wherein the measurement report is reported by the user equipment and carries frequency infoimation and scrambling code information of the current serving cell; and
determining a handover target cell, in the neighboring cell of the previous serving cell, for the user equipment.

11. An apparatus for determining a scrambling code conflict, the apparatus comprising:
a processor, configured to:
determine a previous serving cell of a user equipment before a handover of the user equipment fails, and determine a current serving cell of the user equipment after the handover;
compare frequencies and scrambling codes of the current serving cell and a neighboring cell of the previous serving cell; and
determine, according to a result of the comparing, that a scrambling code conflict exists between the current serving cell and the neighboring cell of the previous serving cell.

12. The apparatus according to claim 11, wherein the processor is configured to:
if the result of the comparing is that the current serving cell and any neighboring cell of the previous serving cell are different cells with a same frequency and a same scrambling code, determine that the scrambling code conflict exists between the current serving cell and the neighboring cell of the previous serving cell.

13. The apparatus according to claim 11, wherein the processor is further configured to:
determine a time at which the user equipment accesses the current serving cell, and determine a time at which the handover of the user equipment fails; and
if an interval between the time at which the user equipment accesses the current serving cell and the time at which the handover of the user equipment fails falls within a set range, execute the comparing step.

14. The apparatus according to claim 11, wherein the processor is further configured to:
determine, according to the result of the comparing, that the current serving cell is a missing neighboring cell of the previous serving cell.

15. The apparatus according to claim 14, wherein the processor is further configured to:
if the result of the comparing is that the current serving cell and all neighboring cells of the previous serving cell are all different cells with different frequencies, determine that the current serving cell is the missing neighboring cell of the previous serving cell.

16. The apparatus according to claim 11, wherein if the handover of the user equipment fails and the user equipment accesses the current serving cell in an access mariner, the processor is configured to:
read release block information of a circuit switch radio access bearer (CS RAB) or release block information of a packet switch radio access bearer (PS RAB) of the user equipment, wherein the release block information of the CS RAB or the release block information of the PS RAB comprises identity information of a serving cell before a call drop of the user equipment occurs.

17. The apparatus according to claim 16, wherein the processor is configured to:
determine, according to a radio resource control (RRC) access request sent by the user equipment, the current serving cell that is accessed by the user equipment after the call drop of the user equipment occurs, wherein the RRC access request carries identity information of the current serving cell.

18. The apparatus according to claim 11, wherein if the handover of the user equipment fails and the user equipment is updated to the current serving cell in a cell update manner, the processor is configured to:
determine, according to a cell update message sent by the user equipment, a serving cell before cell update of the user equipment occurs, wherein the cell update message carries identity information of the previous serving cell.

19. The apparatus according to claim 18, wherein:
the cell update message further comprises cause information of a cell update of the user equipment occurs; and
if the cause information is any one of: an RL failure, TRB RST, and SRB RST, the processor is configured to:
compare frequencies and scrambling codes of the current serving cell and a handover target cell, and
if a result of the comparing is that the frequencies and the scrambling codes of the current serving cell and the handover target cell are the same, determine that a scrambling code conflict exists between the current serving cell and the handover target cell.

20. The apparatus according to claim 11, further comprising:
a receiver, configured to receive a measurement report of the current serving cell, wherein the measurement report is reported by the user equipment and carries frequency information and scrambling code information of the current serving cell,
wherein the processor is further configured to determine a handover target cell, in the neighboring cell of the previous serving cell, for the user equipment.

* * * * *